(12) United States Patent
Yoshimura et al.

(10) Patent No.: US 7,383,875 B2
(45) Date of Patent: Jun. 10, 2008

(54) HEATING/COOLING METHOD, MANUFACTURING METHOD OF IMAGE DISPLAYING APPARATUS, HEATING/COOLING APPARATUS, AND HEATING/COOLING PROCESSING APPARATUS

(75) Inventors: Masanao Yoshimura, Ibaraki (JP); Takeshi Yakou, Ibaraki (JP); Akihiko Komura, Kanagawa (JP); Akihiro Kimura, Kanagawa (JP); Shigeto Kamata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 512 days.

(21) Appl. No.: 10/885,683

(22) Filed: Jul. 8, 2004

(65) Prior Publication Data

US 2005/0034850 A1   Feb. 17, 2005

(30) Foreign Application Priority Data

Jul. 9, 2003   (JP)  ............................. 2003-272431
Sep. 19, 2003  (JP)  ............................. 2003-328290

(51) Int. Cl.
*A47J 39/00* (2006.01)
(52) U.S. Cl. .................... 165/201; 392/416; 392/422; 219/399; 219/405; 438/22
(58) Field of Classification Search .............. 165/201, 165/48.1, 48.2; 219/385, 391, 405, 407, 219/409, 388, 757, 399; 392/416, 418, 422; 118/724; 438/5, 7, 22, 27, 28, 34
See application file for complete search history.

(56) References Cited

U.S. PATENT DOCUMENTS

| | | | | |
|---|---|---|---|---|
| 5,505,647 A | | 4/1996 | Sato et al. ................... 445/25 |
| 5,994,686 A | * | 11/1999 | Salina .......................... 219/750 |
| 6,047,107 A | * | 4/2000 | Roozeboom et al. ......... 392/416 |
| 6,173,116 B1 | * | 1/2001 | Roozeboom et al. ......... 392/416 |
| 6,474,986 B2 | * | 11/2002 | Oda et al. .................... 118/724 |
| 6,753,506 B2 | * | 6/2004 | Liu et al. ..................... 118/724 |
| 6,858,982 B2 | | 2/2005 | Yamada et al. .............. 313/496 |
| 2005/0034850 A1 | | 2/2005 | Yoshimura et al. .......... 165/276 |
| 2005/0112907 A1 | * | 5/2005 | Yoo ............................. 438/795 |

FOREIGN PATENT DOCUMENTS

| | | |
|---|---|---|
| JP | 4-322038 | 11/1992 |
| JP | 7-94102 | 4/1995 |
| JP | 7-216550 | 8/1995 |
| JP | 2000-182543 | 6/2000 |
| JP | 2002-105508 | 4/2002 |
| JP | 2002-324764 | 11/2002 |
| JP | 2003-59788 | 2/2003 |
| JP | 2003-139468 | 5/2003 |
| JP | 2003-141995 | 5/2003 |
| JP | 2003-168362 | 6/2003 |
| JP | 2003-197134 | 7/2003 |
| JP | 2005-43042 | 2/2005 |

OTHER PUBLICATIONS

Translation of JP, 2003-139468, A, [A Description of Drawings], p. 1, and [Claim + Detailed Description], p. 1-8, Apr. 16, 2008.*

* cited by examiner

*Primary Examiner*—Ljiljana Ciric
(74) *Attorney, Agent, or Firm*—Fitzpatrick, Cella, Harper & Scinto

(57) ABSTRACT

A heating/cooling method, a manufacturing method of an image displaying apparatus, a heating/cooling apparatus, and a heating/cooling processing apparatus, in which the heating and cooling of a substrate can be executed at a high speed are provided.

9 Claims, 10 Drawing Sheets

HEATING/COOLING METHOD, MANUFACTURING METHOD OF IMAGE DISPLAYING APPARATUS, HEATING/COOLING APPARATUS, AND HEATING/COOLING PROCESSING APPARATUS

This application claims priority from Japanese Patent Applications No. 2003-272431 filed on Jul. 9, 2003 and No. 2003-328290 filed on Sep. 19, 2003, which are hereby incorporated by reference.

BACKGROUND OF THE INVENTION

1. Field of the Invention

The invention relates to a heating/cooling method, a manufacturing method of an image displaying apparatus, a heating/cooling apparatus, and a heating/cooling processing apparatus.

2. Related Background Art

Hitherto, when a substrate constructing a predetermined apparatus is manufactured, there is a case of executing a heating process for heating the substrate.

A substrate heating apparatus for executing the heating process has been disclosed in Japanese Patent Application Laid-Open No. 2003-59788.

The substrate heating apparatus disclosed in Japanese Patent Application Laid-Open No. 2003-59788 comprises: a heating plate for heating the substrate; a heat reflecting plate arranged so as to face the substrate through the heating plate; and a stage arranged so as to face the substrate through the heat reflecting plate. Further, a passage through which cooling water passes is formed in the stage. A heat reflecting ring is provided around the heating plate.

In the substrate heating apparatus disclosed in Japanese Patent Application Laid-Open No. 2003-59788, heat generated from the heating plate is reflected by the heat reflecting plate and the substrate is also heated by the reflected heat, so that a temperature rising speed of the substrate can be increased.

A method whereby in order to improve cooling efficiency after the heating, a metal plate is provided in parallel with the heated substrate and a radiation heat absorbing layer is provided on the surface of the metal plate which faces the substrate has been disclosed in Japanese Patent Application Laid-Open No. H07-216550.

However, according to the substrate heating apparatus disclosed in Japanese Patent Application Laid-Open No. 2003-59788, there occurs such a problem that when the substrate is cooled, the heat generated from the substrate is reflected by the heat reflecting plate and the reflected heat is again directed toward the substrate, so that a cooling speed of the substrate becomes low. According to the substrate heating apparatus disclosed in Japanese Patent Application Laid-Open No. H07-216550, there is such a problem that heating efficiency upon heating deteriorates considerably.

SUMMARY OF THE INVENTION

It is an object of the invention to provide a heating/cooling method, a manufacturing method of an image displaying apparatus, a heating/cooling apparatus, and a heating/cooling processing apparatus, in which heating and cooling of a substrate can be executed at a high speed.

To accomplish the above object, according to the invention, there is provided a heating/cooling apparatus comprising: a chamber which can hold a work therein; heating means which is arranged in the chamber and heats the work; a heat reflecting member for reflecting heat from the heating means toward the work; and changing means for changing a reflected heat quantity of the heat reflected from the heat reflecting member toward the work so that the reflected heat quantity at the time of cooling after the heating by the heating means is smaller than the reflected heat quantity at the time of the heating by the heating means.

According to the invention, there is provided a heating/cooling method of heating and cooling a work to be subjected to a heating/cooling process in a depressurized atmosphere by using a heat reflecting member provided for the work and heating means for heating the work, comprising:

a heating step of setting an area of heat reflecting surface of the heat reflecting member which faces the work to a state of a first size and heating the work by allowing the heating means arranged between the work and the heat reflecting member to generate heat; and a cooling step of, after the heating step is finished, setting the area of the reflecting surface of the heat reflecting member which faces the work to a state of a second size smaller than the first size and cooling the work.

According to the invention, there is provided another heating/cooling method of heating and cooling a work to be subjected to a heating/cooling process in a depressurized atmosphere by using a heat reflecting member provided for the work and heating means for heating the work, comprising:

a heating step of setting an emissivity of a heat reflecting surface of the heat reflecting member which faces the work to the work to a state of a first emissivity and heating the work by allowing the heating means arranged between the work and the heat reflecting member to generate heat; and a cooling step of, after the heating step is finished, setting the emissivity of the heat reflecting surface of the heat reflecting member which faces the work to the work to a state of a second emissivity smaller than the first emissivity and cooling the work.

According to the invention, the heating and cooling of the substrate can be executed at a high speed.

DESCRIPTION OF THE PREFERRED EMBODIMENTS

Embodiments of the invention will be described hereinbelow with reference to the drawings.

Embodiment 1

Figure 1:
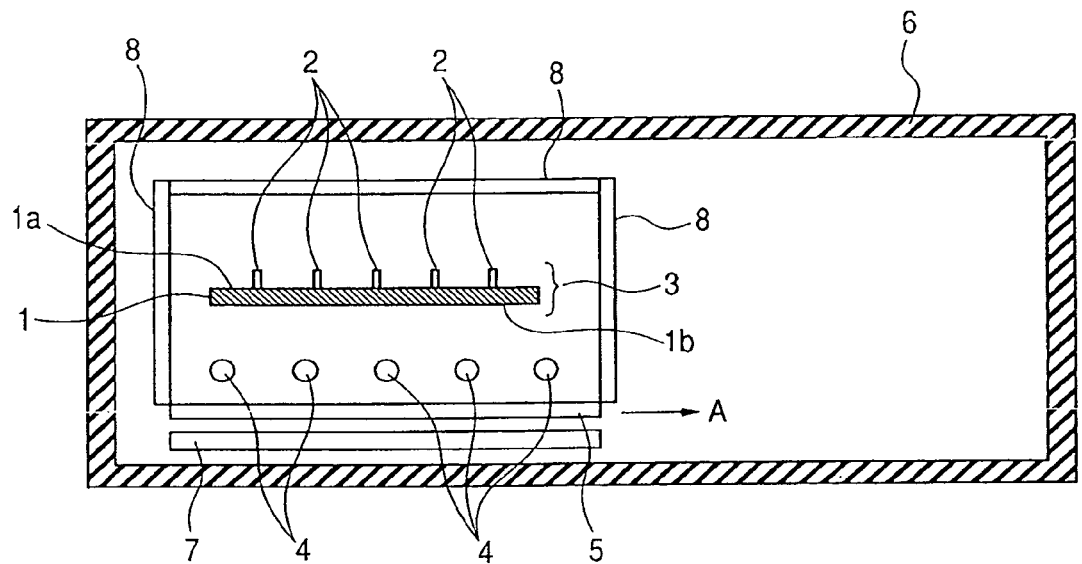
FIG. 1 is a cross sectional view showing a heating/cooling apparatus of an embodiment of the invention.

FIG. 1 is a cross sectional view schematically showing a heating/cooling apparatus of the first embodiment of the invention. In more detail, FIG. 1 is the cross sectional view schematically showing the heating/cooling apparatus when a heating process is executed.

In FIG. 1, the heating/cooling apparatus includes heaters 4, a heat reflecting member 5, a chamber 6, a cooling plate 7, and heat reflecting members 8.

A plurality of supporting pins (not shown) for supporting a substrate 3 (work) in which members 2 are provided only on one surface 1a of a base material 1 are provided in the chamber 6.

The substrate 3 to which the heating process is executed is put on the supporting pins so that the other surface 1b of the base material 1 is come into contact with the supporting pins in the chamber 6.

The heaters 4 are arranged in positions where they face the other surface 1b of the substrate 3 when the substrate 3 is put on the supporting pins so that the other surface 1b of the base material 1 is come into contact with the supporting pins in the chamber 6.

The cooling plate 7 is arranged in a position where it faces the other surface 1b of the substrate 3 through the heaters 4 when the substrate 3 is put on the supporting pins so that the other surface 1b of the base material 1 is come into contact with the supporting pins in the chamber 6. A cooling function (not shown) such as water piping, air-cooling piping, or the like is provided for the cooling plate 7, thereby enabling the cooling plate 7 to be cooled to a predetermined temperature.

An emissivity of the heat reflecting member 5 is smaller than that of the cooling plate 7, (i.e., a heat reflectance of the heat reflecting member 5 is larger than a heat reflectance of the cooling plate 7), and the heat reflecting member 5 is movable.

When the heaters 4 apply the heat to the substrate 3, the heat reflecting member 5 is arranged between the heaters 4 and the cooling plate 7. Therefore, when the heaters 4 apply the heat to the substrate 3, the heat reflecting member 5 reflects the heat generated from the heaters 4, applies the heat to the substrate 3 by the reflected heat, and prevents the heat generated from the heaters 4 from directly reaching the cooling plate 7. A size of an area of a surface (heat reflecting surface) of the heat reflecting member 5 which faces the substrate 3 in this state is defined to be a first size.

When the substrate 3 is cooled, the heat reflecting member 5 is moved in the direction of an arrow A, so that the heat reflecting member 5 ceases to exist between the heaters 4 and the cooling plate 7. Therefore, when the substrate 3 is cooled, the cooling plate 7 faces the other surface 1b of the substrate 3 through the heaters 4. A size of the area of the surface (heat reflecting surface) of the heat reflecting member 5 which faces the substrate 3 in this state (specifically speaking, since the surface of the heat reflecting member 5 which faces the substrate 3 ceases to exist in this state, the size of the area of this surface is equal to 0) is defined to be a second size.

The heat reflecting members 8 are fixed into the chamber 6. The heat reflecting members 8 are arranged so as to surround the substrate 3 and the heaters 4.

A vacuum pump (not shown) for depressurizing the inside of the chamber is provided for the chamber 6. By the operation of the vacuum pump, gases in the chamber 6 are exhausted to the outside of the chamber 6, so that the depressurized atmosphere is formed in the chamber 6.

Figure 2:
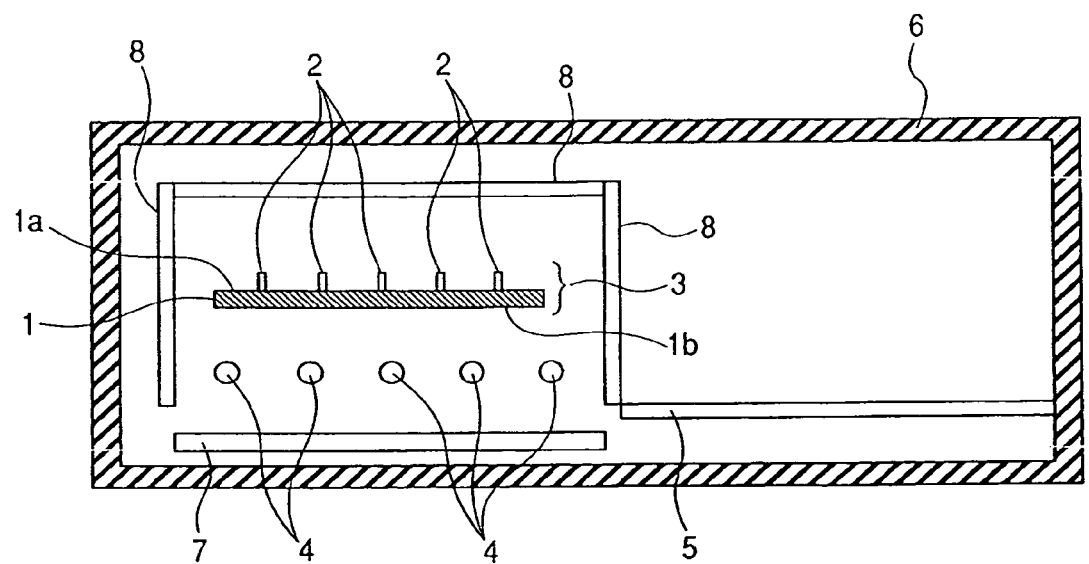
FIG. 2 is a cross sectional view showing another embodiment of the heating/cooling apparatus shown in FIG. 1.

FIG. 2 is a cross sectional view schematically showing the heating/cooling apparatus when the cooling process is executed. In FIG. 2, substantially the same component elements as those shown in FIG. 1 are designated by the same reference numerals.

In FIG. 2, the heat reflecting member 5 is not arranged between the heaters 4 and the cooling plate 7 and the cooling plate 7 is in the state where it faces the other surface 1b of the substrate 3.

The operation of the first embodiment will now be described with reference to FIGS. 1 and 2.

The substrate 3 to which the heating process is executed is mounted on the supporting pins in the chamber 6 so that the other surface 1b of the base material 1 is come into contact with the supporting pins in the chamber 6. As shown in FIG. 1, the heat reflecting member 5 is arranged between the heaters 4 and the cooling plate 7. Therefore, the substrate 3 and the heaters 4 are surrounded by the heat reflecting member 5 and the heat reflecting members 8.

The gases in the chamber 6 are exhausted by the vacuum pump provided for the chamber 6, so that the depressurized atmosphere is formed in the chamber 6.

Subsequently, the heaters 4 generate the heat and heat the substrate 3. When the heaters 4 are made operative so as to generate the heat, the heat directed toward the heat reflecting member 5 in the heat generated by the heaters 4 is reflected by the heat reflecting member 5 and the reflected heat heats the substrate 3. That is, the substrate 3 is heated by the heaters 4 and also heated by the heat reflecting member 5. The substrate 3 is also heated by the heat reflecting members 8.

When the heating process is finished, the heat reflecting member 5 is moved in the direction of the arrow A and as shown in FIG. 2, the heat reflecting member 5 ceases to exist between the heaters 4 and the cooling plate 7. The heat generation of the heaters 4 is stopped, so that the substrate 3 is cooled by the cooling plate 7.

According to the embodiment, since the heat generated from the heaters 4 is reflected by the heat reflecting member 5 and the substrate 3 is heated, heating efficiency is improved more than that in the state where the heat reflecting member 5 ceases to exist.

Further, when the substrate 3 is cooled, by moving the heat reflecting member 5, the area of the surface of the heat reflecting member 5 which faces the substrate 3 is set to be narrower than that of the surface of the heat reflecting member 5 upon heating. Therefore, an amount of heat in the case where the heat generated from the substrate 3 is again supplied to the substrate 3 by the heat reflecting member 5 can be reduced.

Particularly, in the embodiment, since the cooling step is executed in the state where the heat reflecting member 5 is arranged in the position not to face the substrate 3, it is possible to prevent the heat generated from the substrate 3 from again being supplied to the substrate 3 by the heat reflecting member 5 during the cooling step.

When the substrate 3 is cooled, by setting the area of the surface of the heat reflecting member 5 which faces the substrate 3 to be narrower than that of the surface of the heat reflecting member 5 upon heating, the substrate 3 can be cooled by the cooling plate 7 whose emissivity is larger than that of the heat reflecting member 5. In other words, since an amount of heat in the case where the heat generated from the substrate 3 is reflected by the cooling plate 7 and returned to the substrate 3 is much smaller than that of heat which is reflected by the heat reflecting member 5 and returned to the substrate 3, the substrate 3 can be cooled. Further, since the cooling function (not shown) such as water piping, air-cooling piping, or the like is provided for the cooling plate 7 as mentioned above, the cooling plate 7 can be cooled to the predetermined temperature. The heat of the substrate 3 is rapidly absorbed by the cooling plate 7.

In the embodiment, since the cooling step is executed in the state where the heat reflecting member 5 ceases to exist between the substrate 3 and the cooling plate 7 as mentioned above, the cooling of the substrate 3 by the cooling plate 7 can be efficiently performed.

Therefore, according to the embodiment, the heating and cooling of the substrate 3 can be executed at a high speed, respectively.

A specific example of the embodiment is shown below. The embodiment is not limited to the following example.

A glass of a longitudinal size of 600 mm, a lateral size of 900 mm, and a thickness of 2.8 mm is used as a base material 1. A glass of a longitudinal size of 800 mm, a lateral size of 5 mm, and a thickness of 0.5 mm is used as a member (spacer which will-be explained hereinafter) put on the base material 1. Members obtained by paper-finishing the surface of copper are used as heat reflecting members 5 and 8. Dimensions of a region surrounded by the heat reflecting members 5 and 8 are set to a width of 1,000 mm and a depth of 700 mm.

An SUS obtaining by abrasive-blasting processing the surface is used as a cooling plate 7. This cooling plate 7 is movable in the direction that is horizontal to the substrate 3 and always cooled by the water piping (not shown). Sheath heaters are used as heaters 4 for heating the substrate 3.

An example of the specific operation in the case of using the members as mentioned above will now be described. The embodiment is not limited to the following example.

As shown in FIG. 1, the substrate 3 is positioned and put on the supporting pins (not shown). After the substrate 3 is put on, the inside of the chamber 6 is exhausted to $2 \times 10^{-6}$ Pa.

After the inside of the chamber 6 is depressurized, the heaters 4 are made operative so as to generate the heat for 10 minutes and heated to 750° C.

The substrate 3 is heated to 400° C. by the heating of the heaters 4 and held for 30 minutes in this state. The substrate 3 is degassed.

Subsequently, the heat reflecting member 5 arranged so as to face the other surface of the substrate 3 is moved in the direction (direction shown by the arrow A in FIG. 1) that is horizontal to the substrate 3, thereby allowing the cooling plate 7 to face the other surface of the substrate 3 as shown in FIG. 2. After that, the heaters 4 are turned off, thereby cooling the substrate 3.

The heating/cooling processes of the substrate 3 were executed by the above method. Thus, during the heating step, the heat of the heaters 4 is reflected by the heat reflecting member 5, the heating efficiency of the substrate 3 is high, and the temperature rising speed of the substrate 3 is raised than that in the case where the heat reflecting member 5 is not provided.

During the cooling step, the area of the surface of the heat reflecting member 5 which faces the substrate 3 is set to be narrower than that of the surface of the heat reflecting member 5 upon heating and the substrate 3 is cooled by the cooling plate 7 whose emissivity is larger than that of the heat reflecting member 5. Therefore, the cooling efficiency of the substrate 3 is high and a cooling speed of the substrate 3 is raised than that in the case where the area of the surface of the heat reflecting member 5 which faces the substrate 3 is equal to that of the surface of the heat reflecting member 5 upon heating.

Further, the heating/cooling processes of the substrate 3 were executed by the above method. Thus, since transmission and reception of the heat of the substrate 3 are performed by the surface in the uniform surface state (in the embodiment, the surface 1b on which the members 2 are not provided), a temperature difference is difficult to be caused between the surface 1a of the substrate 3 on the side where the members 2 have been provided and the members 2. A break of the substrate 3 due to a difference between coefficients of thermal expansion of the base material 1 and the members 2 does not occur.

According to the embodiment, therefore, there is no break of the substrate 3, both of the temperature rising speed and the cooling speed can be raised, a yield of the substrates 3 is high, and a heating processing time can be shortened.

In the embodiment, by arranging the heat reflecting member 5 to the position where it faces the substrate 3 through the heaters 4 in the heating step and arranging the heat reflecting member 5 to the position not to face the substrate 3 in the cooling step, the area of the surface (heat reflecting surface) of the heat reflecting member 5 which faces the substrate 3 is set to be narrower than that of the surface (heat reflecting surface) of the heat reflecting member 5 upon heating in the cooling step. However, the method of setting the area of the surface (heat reflecting surface) of the heat reflecting member 5 which faces the substrate 3 to be narrower than that of the surface (heat reflecting surface) of the heat reflecting member 5 upon heating in the cooling step is not limited to the above method but can be properly changed.

Embodiment 2

The second embodiment of the invention will now be described. The embodiment relates to an example showing another method of setting the area of the surface (heat reflecting surface) of the heat reflecting member which faces the substrate 3 to be narrower than that of the surface (heat reflecting surface) of the heat reflecting member upon heating in the cooling step.

Figure 3:
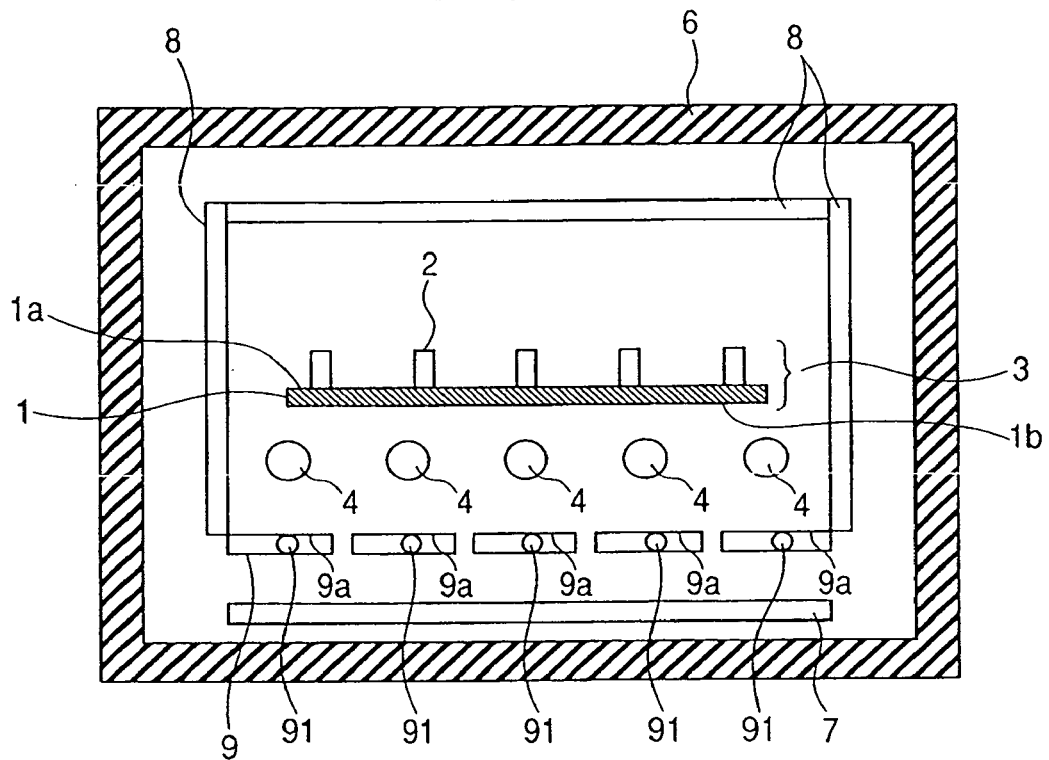
FIG. 3 is a cross sectional view showing a heating/cooling apparatus of another embodiment of the invention.
Figure 4:
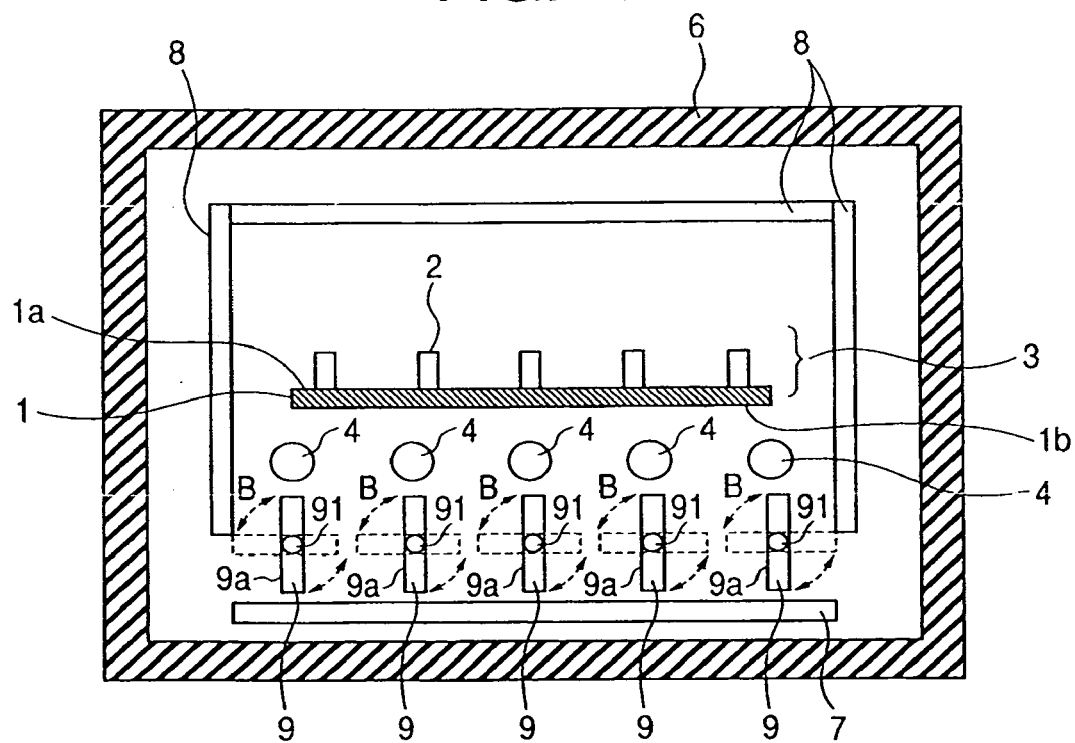
FIG. 4 is a cross sectional view showing another embodiment of the heating/cooling apparatus shown in FIG. 3.

FIGS. 3 and 4 are cross sectional views schematically showing a heating/cooling apparatus of the second embodiment of the invention. In more detail, FIG. 3 is a cross sectional view schematically showing the heating/cooling apparatus at the time of executing the heating process. FIG. 4 is a cross sectional view schematically showing the heating/cooling apparatus at the time of executing the cooling process. In FIGS. 3 and 4, component elements having the same constructions as those shown in FIG. 1 are designated by the same reference numerals.

In FIGS. 3 and 4, the heating/cooling apparatus includes the heaters 4, chamber 6, cooling plate 7, heat reflecting members 8, and heat reflecting members 9.

Each of the heat reflecting members 9 can be rotated in the direction of an arrow B (refer to FIG. 4) around an axis 91 as a rotary axis and its emissivity is smaller than that of the cooling plate 7 (i.e., a heat reflectance of the heat reflecting member 8 is larger than a heat reflectance of the cooling plate 7).

When the heaters 4 apply the heat to the substrate 3, the heat reflecting member 9 is fixed to the position where one surface 9a of the heat reflecting member 9 is horizontal to the other surface 1b of the substrate 3 as shown in FIG. 3 so that the heat generated from the heaters 4 is reflected to the substrate 3 the most by the heat reflecting member 9.

When the substrate 3 is cooled, the heat reflecting member 9 is fixed to the position where one surface 9a of the heat reflecting member 9 is perpendicular to the other surface 1b of the substrate 3 as shown in FIG. 4 so that the substrate 3 is cooled by the cooling plate 7 by setting the area of the surface (heat reflecting surface) of the heat reflecting member 9 which faces the substrate 3 to be narrower than that of the surface (heat reflecting surface) of the heat reflecting member upon heating.

The operation of the second embodiment will now be described with reference to FIGS. 3 and 4.

The substrate 3 to which the heating process is executed is put on the supporting pins in the chamber 6 so that the other surface of the base material 1 is come into contact with the supporting pins in the chamber 6. The heat reflecting member 9 is fixed to the position where one surface 9a of the heat reflecting member 9 is horizontal to the other surface 1b of the substrate 3 as shown in FIG. 3 so that the heat generated from the heaters 4 is reflected to the substrate 3 the most by the heat reflecting member 9.

The gases in the chamber 6 are exhausted by the vacuum pump provided for the chamber 6, so that the depressurized atmosphere is formed in the chamber 6.

Subsequently, the heaters 4 generate the heat and heat the substrate 3. When the heaters 4 are made operative so as to generate the heat, the heat directed toward the heat reflecting members 9 in the heat generated by the heaters 4 is reflected by the heat reflecting members 9 and the reflected heat heats the substrate 3. That is, the substrate 3 is heated by the heaters 4 and also heated by the heat reflecting members 9.

When the heating process is finished, the heat reflecting member 9 is fixed to the position where one surface 9a of the heat reflecting member 9 is perpendicular to the other surface 1b of the substrate 3 as shown in FIG. 4 so that the heat of the substrate 3 is cooled by the cooling plate 7. The heat generation of the heaters 4 is stopped. Thus, the substrate 3 is cooled by the cooling plate 7.

According to the embodiment, since the heat generated by the heaters 4 is reflected by the heat reflecting members 9 and the substrate 3 is heated, heating efficiency is improved more than that in the state where no heat reflecting member 9 exists. Further, when the substrate 3 is cooled, by rotating the heat reflecting member 9 around the axis 91 as a rotational center, the substrate 3 can be cooled by using the cooling plate 7 whose emissivity is larger than that of the heat reflecting member 9 (i.e., a heat reflectance of the cooling plate 7 is smaller than a heat reflectance of the heat reflecting member 9). Therefore, both of the heating and the cooling can be executed at a high speed.

Embodiment 3

The third embodiment of the invention will now be described. The embodiment relates to an example showing another method of setting the area of the surface of the heat reflecting member which faces the substrate 3 to be narrower than that of the surface of the heat reflecting member upon heating in the cooling step.

Figure 5:
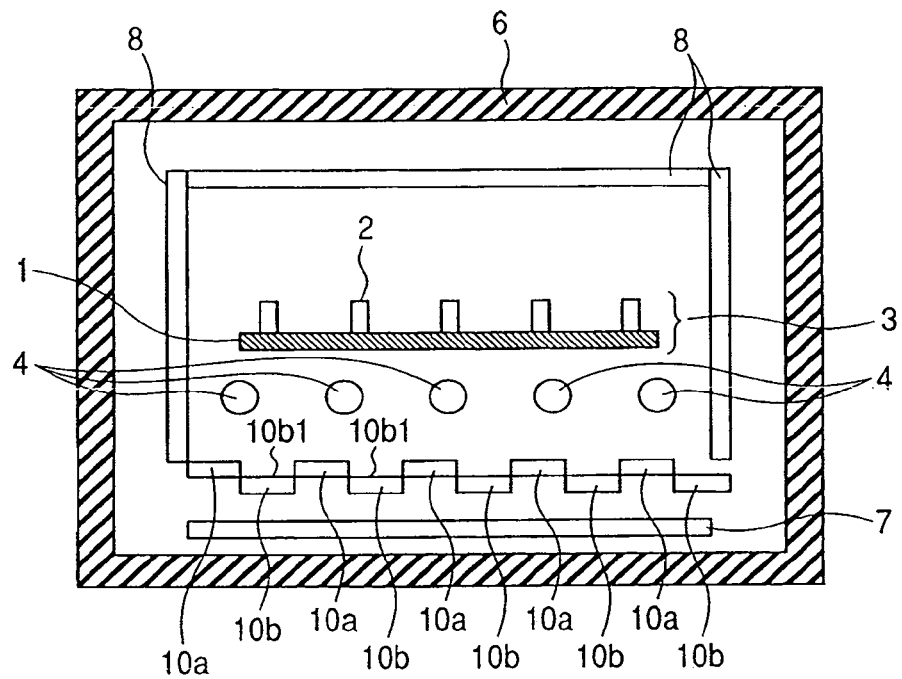
FIG. 5 is a cross sectional view showing a heating/cooling apparatus of further another embodiment of the invention.
Figure 6:
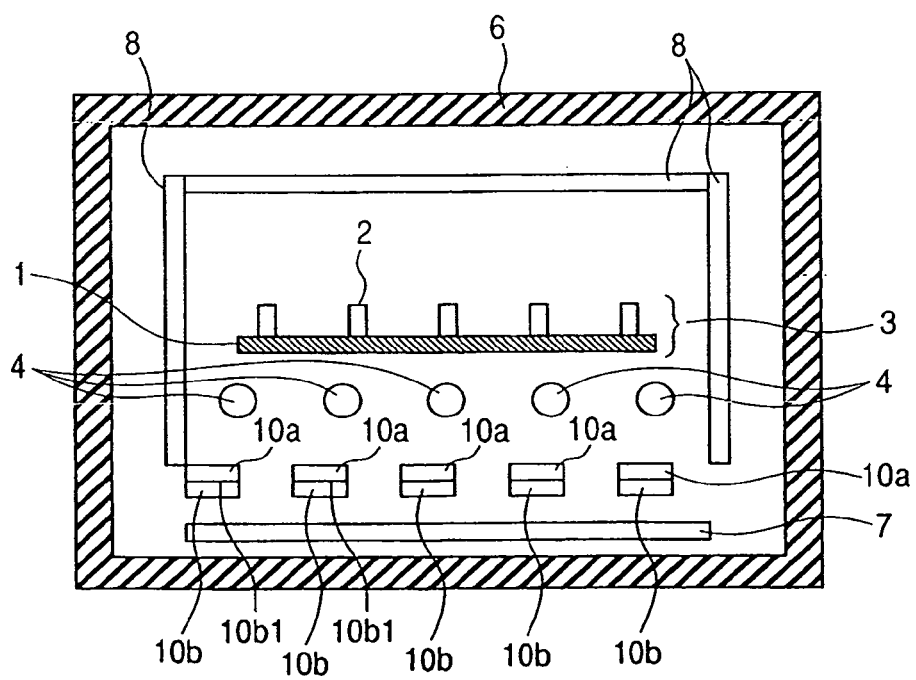
FIG. 6 is a cross sectional view showing another embodiment of the heating/cooling apparatus shown in FIG. 5.

FIGS. 5 and 6 are cross sectional views schematically showing a heating/cooling apparatus of the third embodiment of the invention. In more detail, FIG. 5 is a cross sectional view schematically showing the heating/cooling apparatus at the time of executing the heating process. FIG. 6 is a cross sectional view schematically showing the heating/cooling apparatus at the time of executing the cooling process. In FIGS. 5 and 6, component elements having the same constructions as those shown in FIG. 1 are designated by the same reference numerals.

In FIGS. 5 and 6, the heating/cooling apparatus includes the heaters 4, chamber 6, cooling plate 7, heat reflecting members 8, heat reflecting members 10a serving as first heat reflecting members, and heat reflecting members 10b serving as second heat reflecting members.

Each of the heat reflecting members 10a is fixed into the chamber 6 and has an emissivity smaller than that of the cooling plate 7.

Each of the heat reflecting members 10b is in the direction that is horizontal to the other surface 1b of the substrate 3 and has an emissivity smaller than that of the cooling plate 7.

When the heaters 4 apply the heat to the substrate 3, the heat reflecting member 10b is arranged between the heat reflecting members 10a as shown in FIG. 5 so that the heat generated from the heaters 4 is reflected to the substrate 3 the most by the heat reflecting members 10a and 10b. In other words, when the heaters 4 apply the heat to the substrate 3, the reflecting members 10b are arranged in the position where they face the substrate 3 through the heaters 4 without intervening the heat reflecting members 10a.

When the substrate 3 is cooled, the heat reflecting member 10b is arranged in the position where a surface 10b1 of the heat reflecting member 10b which faces the substrate 3 is overlaid with the heat reflecting member 10a as shown in FIG. 6 so that the heat of the substrate 3 is cooled by the cooling plate 7, and the heat of the substrate 3 is propagated to the cooling plate 7 from a space between the heat reflecting members 10a.

The operation of the third embodiment will now be described with reference to FIGS. 5 and 6.

The substrate 3 to which the heating process is executed is put on the supporting pins in the chamber 6 so that the other surface of the base material 1 is come into contact with the supporting pins in the chamber 6. The heat reflecting member 10b is arranged between the heat reflecting members 10a as shown in FIG. 5 so that the heat generated from the heaters 4 is reflected to the substrate 3 the most by the heat reflecting members 10a and 10b.

The gases in the chamber 6 are exhausted by the vacuum pump provided for the chamber 6, so that the depressurized atmosphere is formed in the chamber 6.

Subsequently, the heaters 4 generate the heat and heat the substrate 3. When the heaters 4 are made operative so as to generate the heat, the heat directed toward the heat reflecting members 10a or 10b in the heat generated by the heaters 4 is reflected by the heat reflecting members 10a or 10b and the reflected heat heats the substrate 3. That is, the substrate 3 is heated by the heaters 4 and also heated by the heat reflecting members 10a or 10b.

When the heating process is finished, the heat reflecting member 10b is arranged in the position where it is overlaid with the heat reflecting member 10a as shown in FIG. 6 so that the heat of the substrate 3 is cooled by the cooling plate 7, and the heat of the substrate 3 is propagated to the cooling plate 7 from the space between the heat reflecting members 10a.

According to the embodiment, since the heat generated from the heaters 4 is reflected by the heat reflecting members 10a and 10b and the substrate 3 is heated, the heating efficiency is improved more than that in the state where the heat reflecting members 10a and 10b do not exist. Further, when the substrate 3 is cooled, since the heat reflecting member 10b is arranged in the position where it is overlaid with the heat reflecting member 10a, the substrate 3 can be cooled by the cooling plate 7 whose emissivity is larger than that of the heat reflecting member 10b (i.e., a heat reflectance of the cooling plate 7 is smaller than a heat reflectance of the heat reflecting member 10). Thus, the heating and cooling of the substrate 3 can be executed at a high speed, respectively.

The invention is not limited to each of the foregoing embodiments but, naturally, many modifications and variations are possible.

For example, a substrate constructing a vessel which contains the image display unit can be used as a substrate 3. In other words, in a manufacturing method of the image displaying apparatus including the image display unit and the vessel which contains the image display unit, the substrate constructing the vessel which contains the image display unit can be heated and cooled by the above method. In this case, the substrate constructing the vessel which contains the image display unit can be heated and cooled at a high speed and a possibility that the substrate is broken at the time of heating can be reduced. The invention can be also applied to such a construction that the vessel containing the image display unit comprises: two substrates which face each other; a spacer member which is positioned so as to be sandwiched between the two substrates and defines an interval between the substrates; and a frame member which is located around the two substrates. That is, a base material on which the spacer is arranged can be also heated and cooled as a substrate 3 in the foregoing embodiments.

For example, the cooling plate 7 can be omitted in each embodiment. In this case, although the cooling speed of the substrate 3 is lower than that in the case where the cooling plate 7 exists, it is higher than that in the case of executing the cooling step in the state where the heat reflecting member is in the heating step as it is.

Embodiment 4

Figure 7:
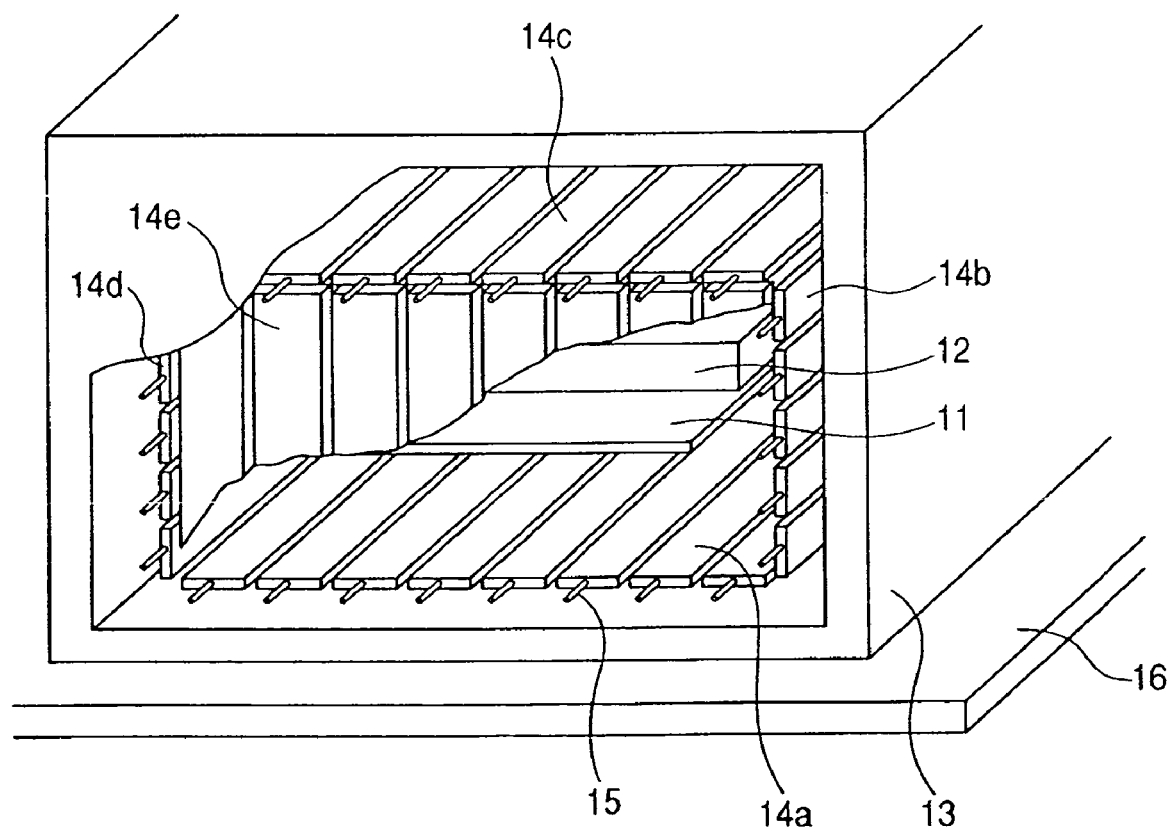
FIG. 7 is a perspective view showing the fourth embodiment of a heating/cooling apparatus according to the invention.

FIG. 7 is a perspective view showing the fourth embodiment of a heating/cooling apparatus according to the invention. FIG. 7 is a diagram with a part cut away. In the diagram, reference numeral 16 denotes a vacuum chamber for executing the heating/cooling process in a vacuum. A work 11 and a heater 12 are arranged in the vacuum chamber 16 at a distance. The work 11 is a processing target and is, for example, a glass substrate or the like of the image displaying apparatus.

Reflectors (heat reflecting members) 14 of a low emissivity are arranged so as to surround the work 11 and the heater 12. That is, lower reflectors 14a, right reflectors 14b, upper reflectors 14c, left reflectors 14d, and front reflectors 14e are arranged.

Figure 8:
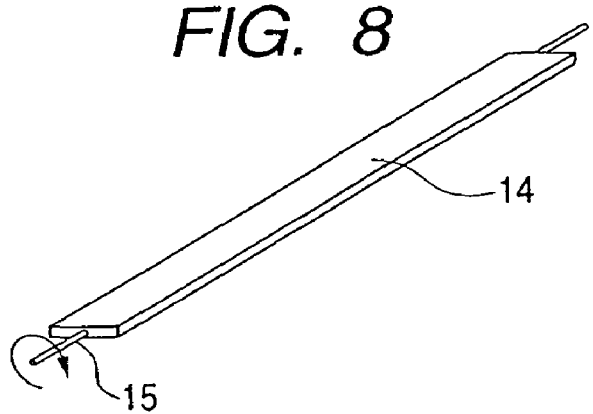
FIG. 8 is a perspective view of a reflector.
Figure 11:
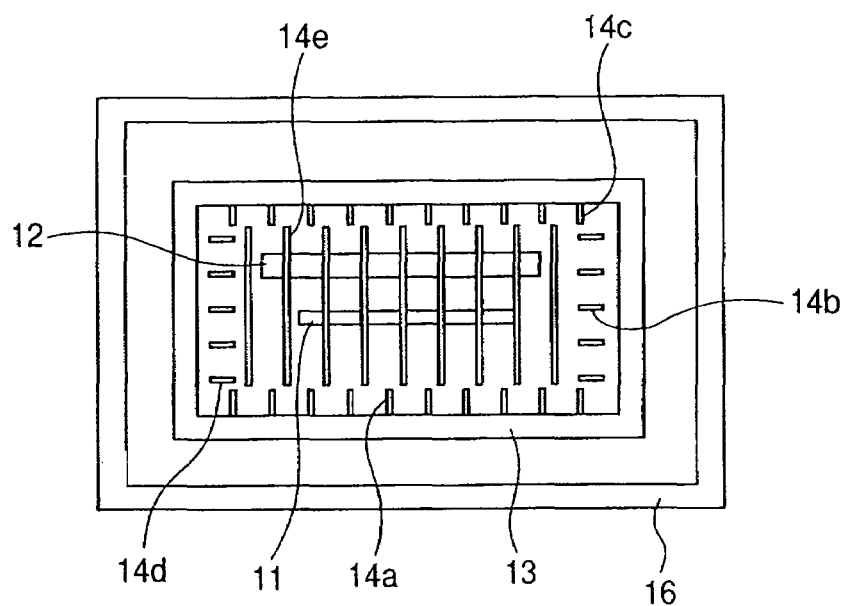
FIG. 11 is a front view of the apparatus of FIG. 7 at the time of cooling.

Although not shown in FIG. 11, rear reflectors similar to the front reflectors 14e are also arranged. Although the front reflectors 14e are illustrated in the diagram with a part cut away for simplicity of illustration, they have a shape similar to each of the other reflectors. FIG. 8 shows a perspective view of each reflector 14. As shown in FIG. 8, each reflector has a strip-shape and is rotatable around a rotary axis 15 as a rotational center.

A cooling unit 13 is arranged on the outside of the reflectors 14. It is assumed that an emissivity of the cooling unit 13 is larger than that of the reflector. The cooling unit 13 is made of a material of a large heat capacity and can further improve the cooling efficiency by circulation or the like of cooling water or the like by a cooling pipe provided in the cooling unit.

Figure 9:
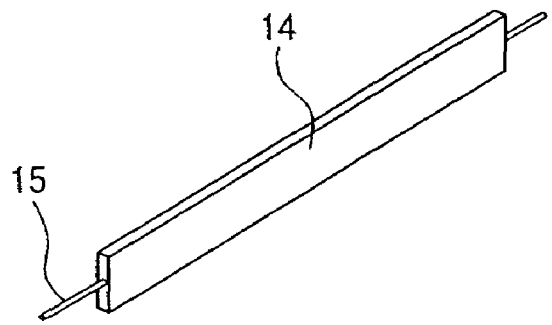
FIG. 9 is a perspective view showing the state where the reflector is rotated by 90°.

Upon heating, the heating process is executed in the state where the inside of the chamber is covered with the reflectors 14 as shown in FIG. 7 and the heating efficiency of the work 11 is improved by an effect of the reflectors 14 of the low emissivity (high heat reflectance). Upon cooling after the heating, as shown in FIG. 9, each reflector 14 is rotated around the rotary axis 15 as a rotational center and stops when it is rotated by 90°. Therefore, the heat of the work 11 is irradiated to the surface of the cooling unit 13 instead of the reflectors 14. Since the emissivity of the cooling unit 13 is high (the heat reflectance of the cooling unit 13 is small), the heat radiation by the work 11 can be easily absorbed and the cooling efficiency of the work 11 can be improved.

Figure 10:
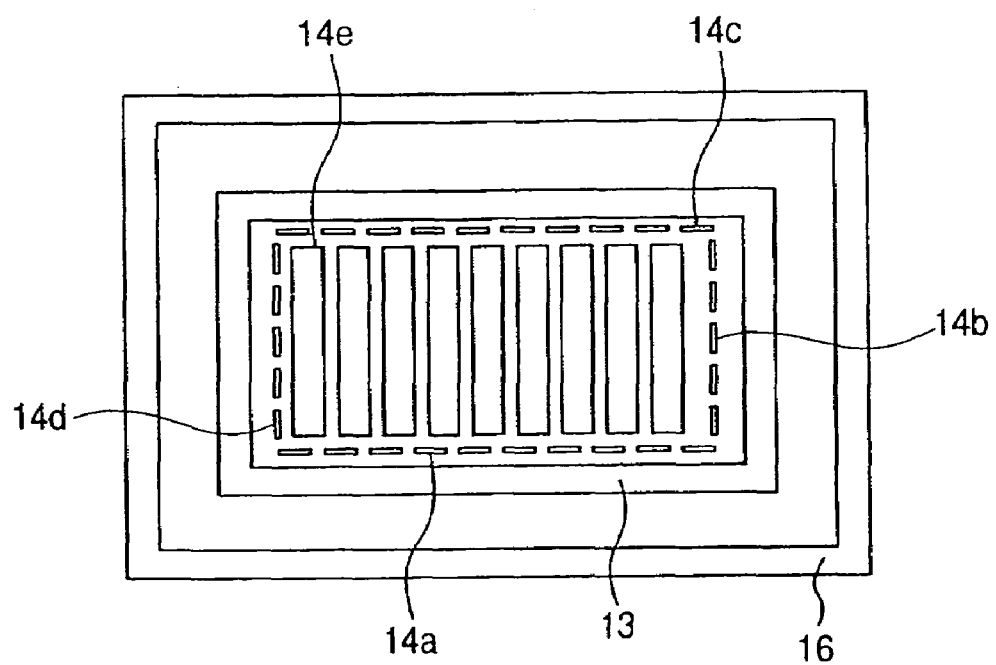
FIG. 10 is a front view of the apparatus of FIG. 7 at the time of heating.
Figure 17:
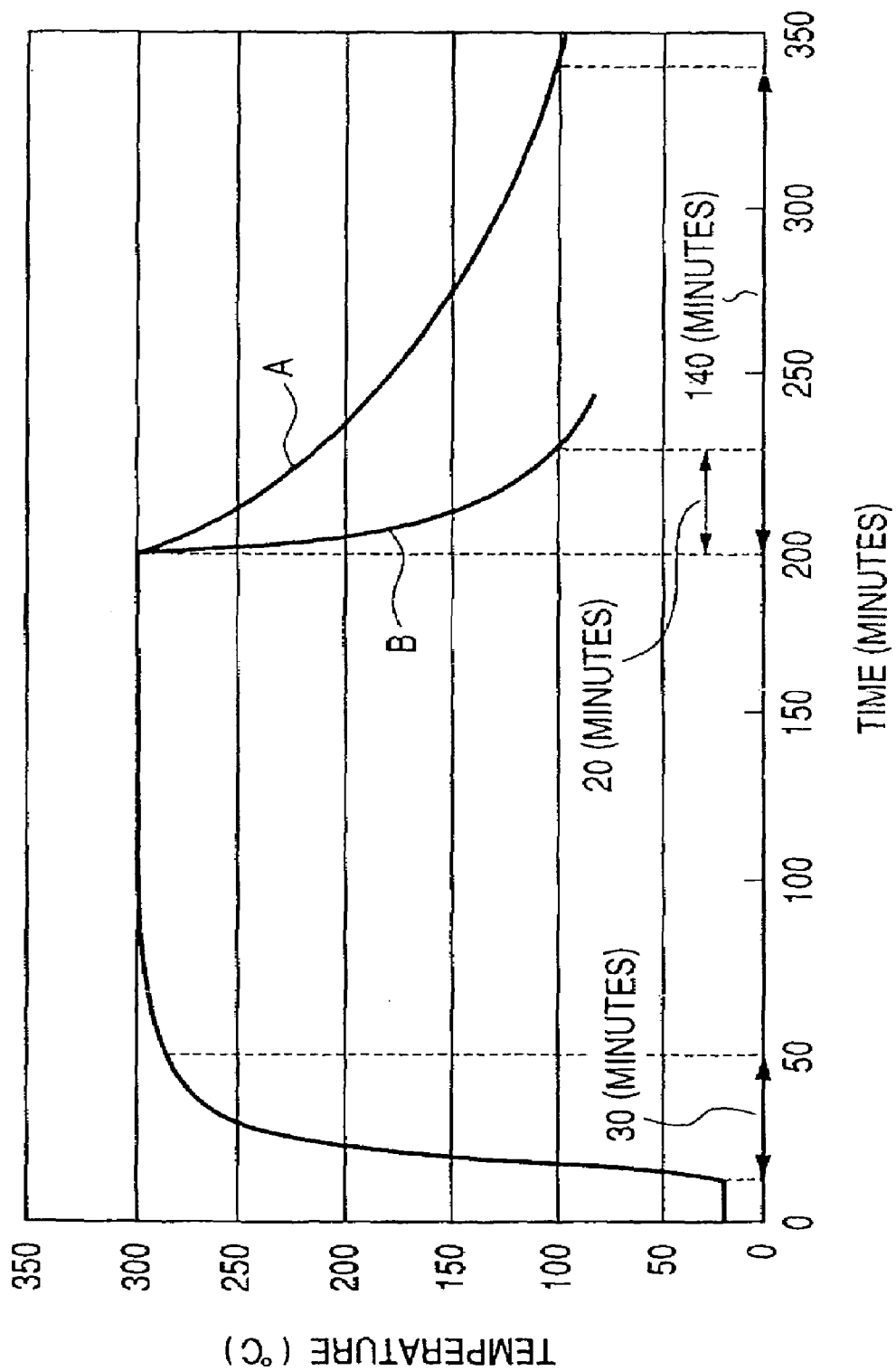
FIG. 17 is a graph showing heating/cooling characteristics between the invention and comparison examples for comparing them.

FIG. 10 is a front view of the apparatus of FIG. 7 at the time of heating. Upon heating, as shown in FIG. 10, the work 11 and the heater 12 are surrounded by the reflectors 14 in the state where a gap hardly exists. FIG. 11 shows a state at the time of cooling. Upon cooling, as shown in FIG. 11, each of the lower reflectors 14a, right reflectors 14b, upper reflectors 14c, left reflectors 14d, front reflectors 14e, and rear reflectors (not shown) is rotated by 90° around the rotary axis 15 as a rotational center. Therefore, although the heating efficiency of the work 11 has been raised upon heating, since each reflector 14 is rotated by 90° upon cooling, the heat of the work 11 and the heater 12 is irradiated to the cooling unit 13. A curve B shown in FIG. 17 indicates a cooling curve in the case where the invention is used. A curve A shows a cooling curve in the case where the reflectors 14a to 14e and the rear reflectors (not shown) are not rotated. It will be understood from FIG. 17 that cooling characteristics shown by the curve B in the case where the invention is applied are remarkably improved as compared with those of the curve A to which the invention is not applied.

Figure 12:
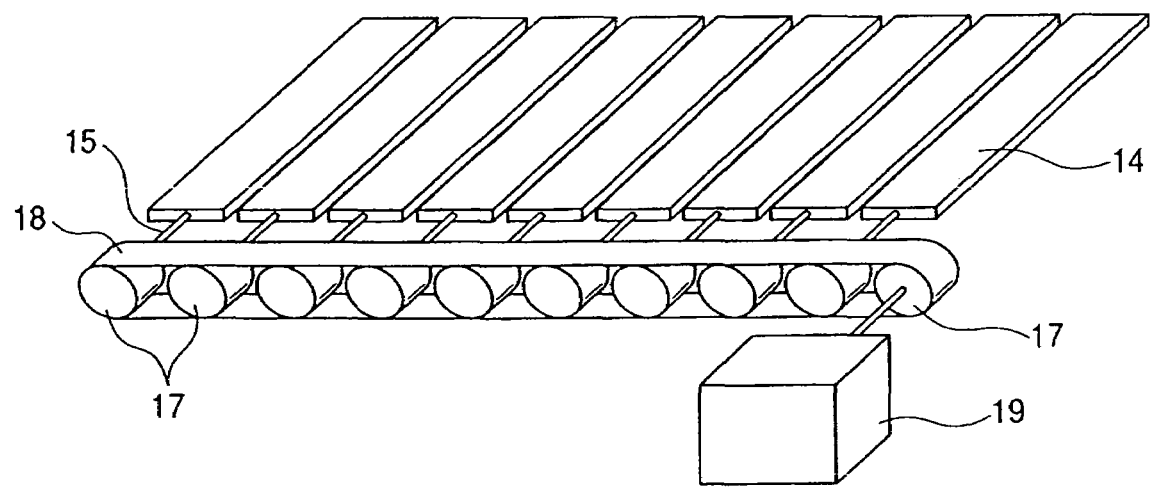
FIG. 12 is a perspective view showing an example of a rotation driving apparatus of the reflectors.
Figure 13:
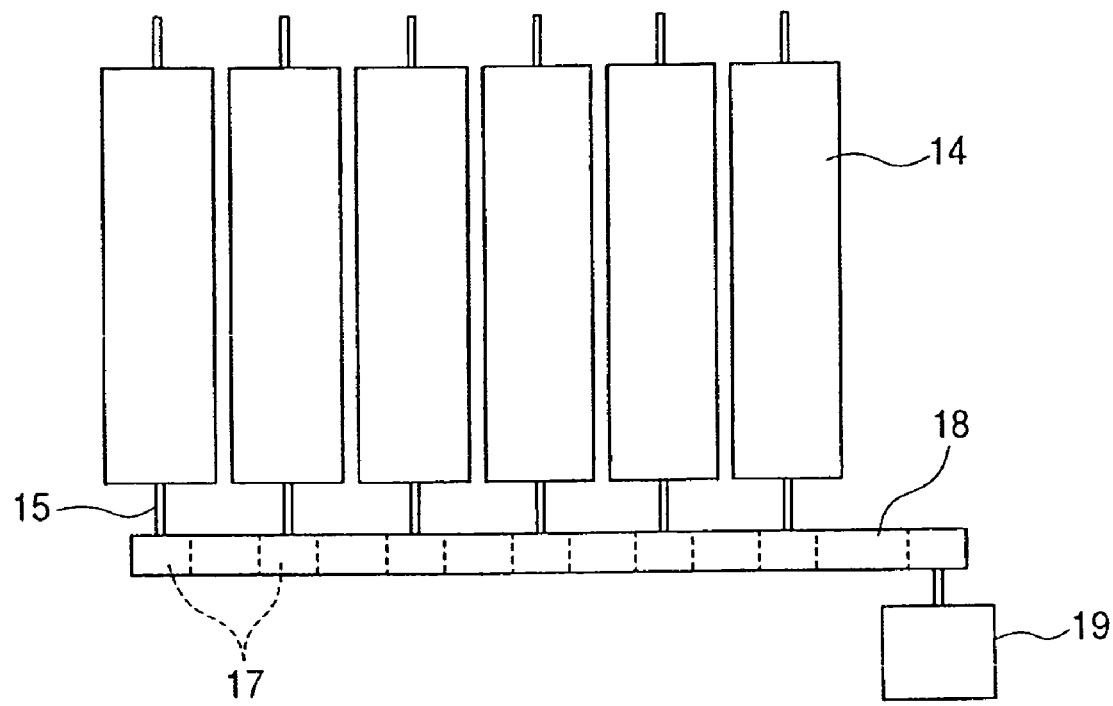
FIG. 13 is a plan view of FIG. 12.
Figure 14:
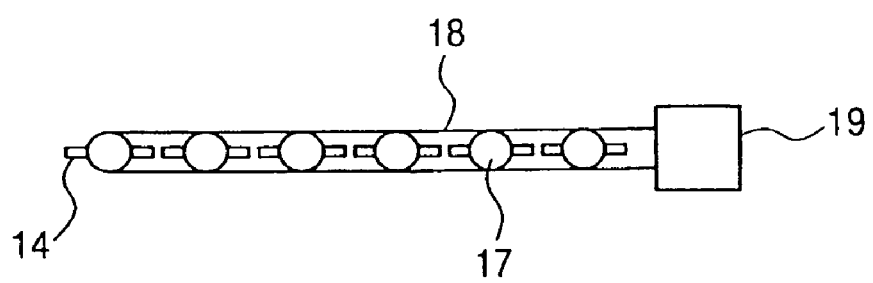
FIG. 14 is a front view of FIG. 12.

FIG. 12 is a perspective view showing an example of a driving apparatus of the reflector. FIG. 13 is a plan view and FIG. 14 is a front view of FIG. 12. A gear 17 is provided at a front edge of each rotary axis 15 associated with each reflector 14. A gear 17 similar to the gear 17 attached to each reflector 14 is attached to a front edge of a rotary axis of a motor 19 and this gear is arranged in a line together with the gears 17 of the other reflectors. A belt 18 is wound around the gears 17. When the motor 19 is driven, the belt 18 is moved, so that each gear 17 is rotated and each reflector 14 is rotated. In this manner, the rotation of each reflector is controlled upon heating and upon cooling.

The reflector driving apparatus shown in FIGS. 12 to 14 drives the reflectors every column of the lower reflectors 14a, right reflectors 14b, upper reflectors 14c, left reflectors 14d, front reflectors 14e, and rear reflectors.

Embodiment 5

Figure 15:
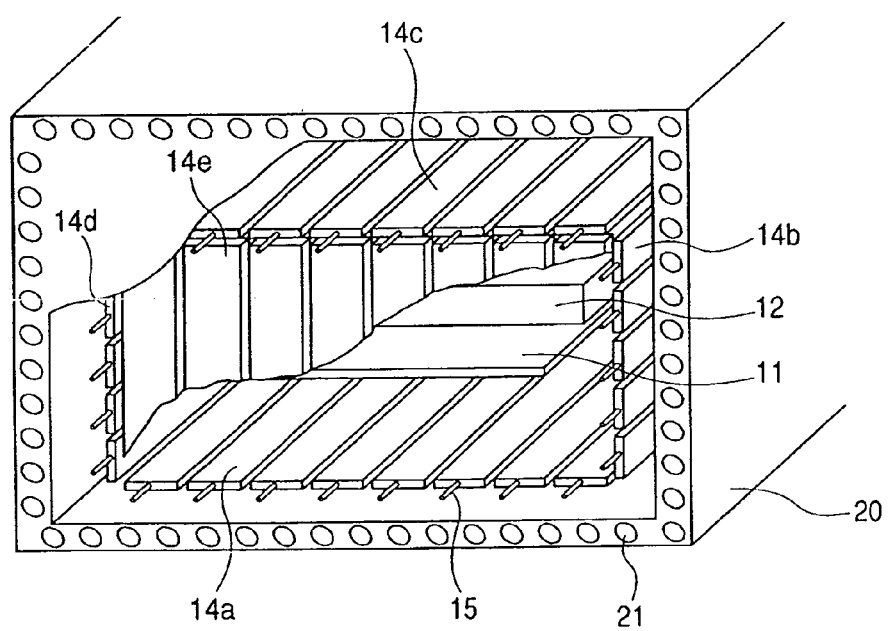
FIG. 15 is a perspective view showing the fifth embodiment of the invention.

FIG. 15 is a perspective view showing the fifth embodiment of the invention. In FIG. 15, substantially the same component elements as those shown in FIG. 7 are designated by the same reference numerals. The work 11 and the heater 12 are arranged in a cooling vacuum chamber 20 at a distance.

In a manner similar to FIG. 7, the work 11 and the heater 12 are surrounded by the reflectors 14 of the low emissivity (high heat reflectance) and each reflector 14 is rotated around the rotary axis 15 as a rotational center. An inner surface of the cooling vacuum chamber 20 is a surface having a high emissivity.

The cooling vacuum chamber 20 has cooling pipes 21 and functions in a manner similar to the cooling unit 13 in FIG. 7 by circulating the cooling water or the like into the cooling pipes 21. Also in this embodiment, in a manner similar to the embodiment 4 described with reference to FIG. 7 mentioned above, by rotating each reflector 14 by 90°, the heating and cooling of the work 11 are assisted. In the embodiment, although the mechanism of the cooling unit has to be added to the cooling vacuum chamber 20 itself as compared with the embodiment 4 of FIG. 7, since there is no need to provide the cooling unit into the cooling vacuum chamber 20, the vacuum chamber can be further miniaturized and an effect of reduction in costs and shortening ducts can be expected.

Embodiment 6

Figure 16A:
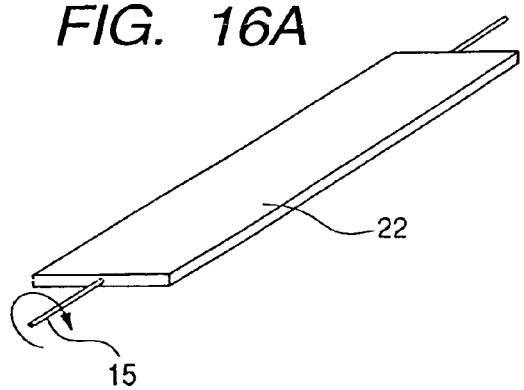
FIGS. 16A and 16B are a perspective view and a front view showing another embodiment of the reflector.
Figure 16B:
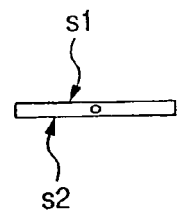

FIGS. 16A and 16B show another embodiment of the reflector which is used in the fourth and fifth embodiments. FIG. 16A is a perspective view and FIG. 16B is a front view of a reflector. Emissivities of an obverse and a reverse of a reflector 22 are different and the reflector 22 is rotated around the rotary axis 15 as a rotational center. The emissivity of a surface s1 of the reflector 22 is low and that of a surface s2 of the reflector 22 is high (i.e., a heat reflectance of the surface s1 of the reflector 22 is larger than a heat reflectance of the surface s2 of the reflector 22). Upon heating, the surface s1 faces the work 11. Upon cooling, the reflector 22 whose emissivities of the obverse and the reverse are different is rotated by 180° around the rotary axis 15 as a rotational center, thereby allowing the surface s2 to face the work 11. Since the surface s1 has the low emissivity, it assists the heating. Since the surface s2 has the high emissivity, it assists the cooling. The reflectors 22 are used as all of the reflectors 14a to 14e (also including the rear reflectors) in the embodiments 4 and 5 described with reference to FIGS. 7 and 15.

As a method of realizing the low emissivity and the high emissivity of the reflector 22, for example, a method of using the surface s1 as a polished surface and using the surface s2 as a ceramics coating surface is preferable because it is relatively easy and a high effect can be expected. In the embodiment, since there is no need to arrange the cooling unit, construct the vacuum chamber as a cooling unit, or the like, costs of equipment are relatively reasonable. However, if a heat capacity of the reflector 22 whose emissivities of the obverse and the reverse are different is fully filled, the cooling assisting function deteriorates. Therefore, it is desirable to use such a reflector 22 in the case of cooling the work which has been heated to a relatively low temperature instead of cooling the work which has been heated to a very high temperature.

A case where the invention is applied to a baking step of a conductive paste material, a dielectric paste material, or the like in the manufacturing process of an image processing apparatus or the like will now be described hereinbelow.

Figure 18:
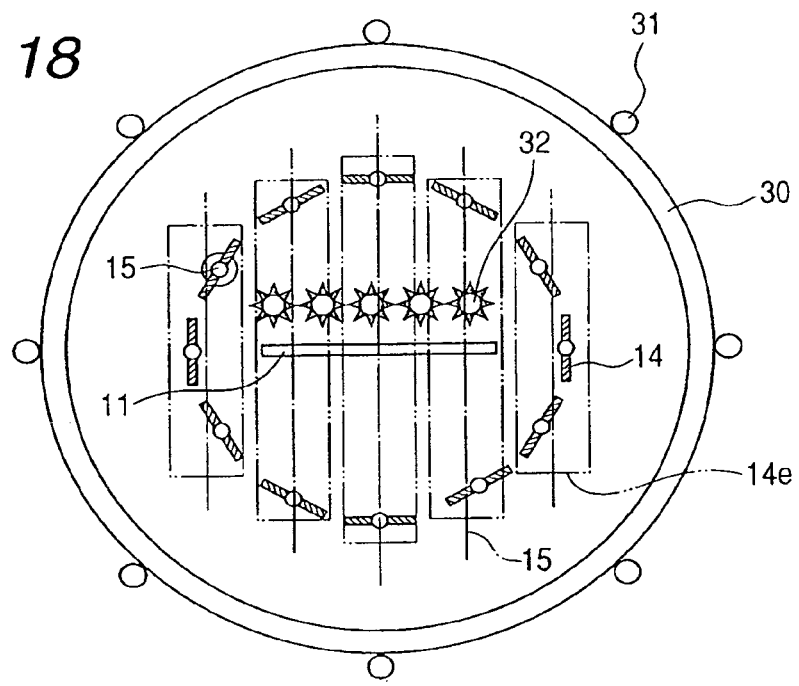
FIG. 18 is a front view showing another form of the heating/cooling apparatus according to the invention at the time of heating.
Figure 19:
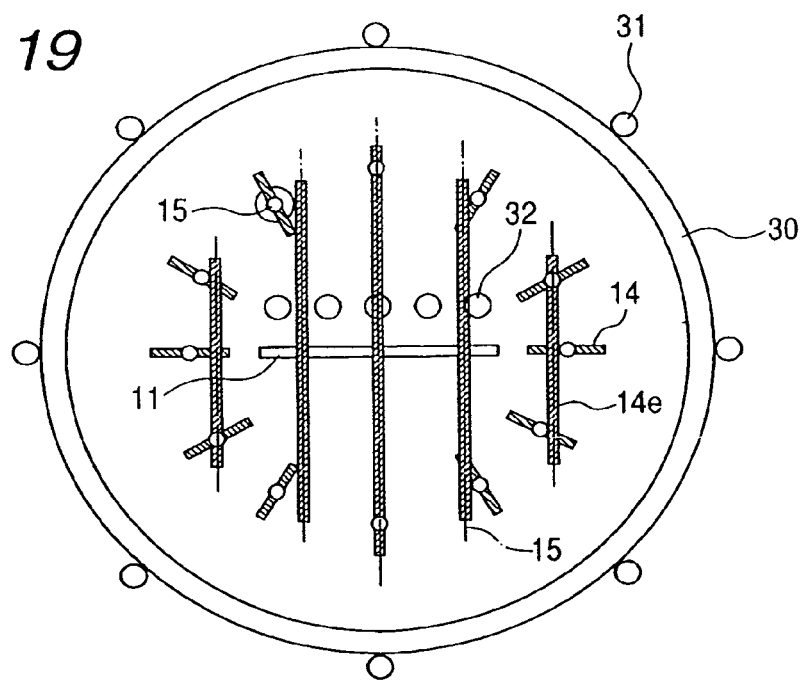
FIG. 19 is a front view showing another form of the heating/cooling apparatus according to the invention at the time of cooling.

FIG. 18 is a front view showing the state upon heating and FIG. 19 is a front view showing the state upon cooling. Although not shown in FIGS. 18 and 19, the rear reflectors are also arranged on the rear surface in a manner similar to the front reflectors 14e. The front reflector 14e is shown as a perspective diagram by an alternate long and two short dashes line in FIG. 18 for simplicity of drawing. Further, although not shown in FIGS. 18 and 19, an intake pipe and an exhaust pipe for intake and exhaustion necessary for baking and debinding of the conductive paste material, dielectric paste material, or the like are also arranged on the front and rear sides of the work 11, respectively.

The work 11 and halogen lamp heaters 32 are arranged in a cooling chamber 30 at a distance. A predetermined quantity of air in the cooling chamber 30 is ventilated by the intake pipe and the exhaust pipe arranged on the front and rear sides of the work 11. The work 11 and the halogen lamp heaters 32 are surrounded by the reflectors 14 of the low emissivity and each reflector 14 is rotated around the rotary axis 15 as a rotational center in a manner similar to FIG. 7.

An inner surface of the cooling chamber 30 has a high emissivity. The cooling chamber 30 has the cooling pipes 31 and functions in a manner similar to the cooling unit in FIG. 7 by circulating a cooling medium such as cooling water or the like into the cooling pipes 31. Also in this embodiment, in a manner similar to the embodiment of FIG. 7 mentioned above, by rotating each reflector 14 by 90°, the radiation heating and radiation cooling of the work 11 are effectively executed.

For example, a metal such as gold, silver, copper, aluminum, or the like is preferable as a material of the reflector 14 of the low emissivity (high heat reflectance). A polished surface is preferable as a working state of the surface.

For example, a ceramics coating surface or a surface on which a metal such as SUS310-S, inconel, or the like has been sufficiently oxidized by heat at a high temperature is preferable as an inner surface of the cooling chamber 30 of the high emissivity.

Since the halogen lamp heaters 32 are used as a heat source, the heat capacity is smaller than that of the sheath heater, hot plate, or the like, a leading (trailing) speed of energy is high, the lamp has a fine cylindrical shape, it is advantageous for radiation cooling upward of the work, and the like. Consequently, the cooling efficiency can be improved as compared with those in the foregoing embodiments.

In the foregoing embodiments, since there is no need to execute the heating and cooling in the different vessels, that is, in a conventional large baking furnace whose length is long and which is constructed by a number of vessels, the chamber can be miniaturized and, further, a very large setting area of the apparatus is unnecessary, so that an effect of reduction in costs can be also expected.

The invention is not limited to the heating and cooling in the vacuum as mentioned above but can be used in the heating/cooling process in, for example, an inert atmosphere or an ordinary atmosphere. In this case, a sufficient effect can be obtained. That is, the invention is characterized in that the heating and cooling can be efficiently executed without releasing the atmosphere upon heating and cooling irrespective of the vacuum atmosphere, inert atmosphere, ordinary atmosphere, or the like.

What is claimed is:

1. A manufacturing method of an image displaying apparatus having a vessel which contains an image display unit, said method comprising a step of heating and cooling a substrate which is a constitutional member of the vessel, wherein the step of heating and cooling comprises:

a heating step of setting an area of a heat reflecting surface of a heat reflecting member which faces said substrate to a state of a first size and heating said substrate by allowing a heating means arranged between said substrate and said heat reflecting member to generate heat; and a cooling step of, after said heating step is finished, moving said heat reflecting member for setting the area of the heat reflecting surface of said heat reflecting member which faces said substrate to a state of a second size smaller than said first size and cooling said substrate.

2. A method according to claim 1, wherein a member is provided on only one surface of said substrate, and an area of the other surface is smaller than that of said one surface, and said heating step is executed in the state where said other surface of said substrate faces said heating means and said heat reflecting member.

3. A method according to claim 1, wherein said heating step is executed in the state where said heat reflecting member is arranged in a position where it faces said substrate through said heating means, and said cooling step is executed in the state where said heat reflecting member is arranged in a position not to face said substrate.

4. A method according to claim 1, wherein said cooling step is executed in the state where said heat reflecting member is moved such that an angle of said heat reflecting member to said substrate is changed from said angle at the time of said heating step.

5. A method according to claim 1, wherein said heat reflecting member includes a plurality of first heat reflecting members arranged at predetermined intervals and a plurality of second movable heat reflecting members, said heating step is executed in the state where said second heat reflecting member is arranged in a position where it faces said substrate through said heating means, and said cooling step is executed in the state where said second heat reflecting member is moved so as to be arranged in a position where a surface of said second heat reflecting member which faces said substrate is overlaid with said first heat reflecting member.

6. A method according to claim 1, wherein a cooling plate is arranged in a position where it faces said substrate through said heating means, said heating step is executed in the state where said heat reflecting member is arranged between said heating means ans said cooling plate, and in said cooling step, said substrate is cooled by using said cooling plate.

7. A manufacturing method of an image displaying apparatus having a vessel which contains an image display unit, said method comprising a step of heating and cooling a substrate which is a constitutional member of the vessel, wherein the step of heating and cooling comprises:

a heating step of setting an emissivity, for said substrate, of a heat reflecting surface of said heat reflecting member which faces said substrate to a state of a first emissivity and heating said substrate by allowing a heating means arranged between said substrate and said heat reflecting member to generate heat; and a cooling step of, after said heating step is finished, moving said heat reflecting member for setting the emissivity, for said substrate, of the heat reflecting surface of said heat reflecting member which faces said substrate to a state of a second emissivity smaller than said first emissivity and cooling said substrate.

8. A method according to claim 7, wherein a member is provided on only one surface of said substrate, and an area of the other surface is smaller than that of said one surface, and said heating step is executed in the state where said other surface of said substrate faces said heating means and said heat reflecting member.

9. An apparatus according to claim 7, wherein said heat reflecting member is constructed by a plurality of strip-shaped members, said one surface of said strip-shaped member has higher emissivity and the other surface has lower emissivity, said heating step is executed in the state where one surface of said strip-shaped members faces said substrate and said cooling step is executed in the state where the other surface of said strip-shaped members faces said substrate.

* * * * *

UNITED STATES PATENT AND TRADEMARK OFFICE
CERTIFICATE OF CORRECTION

| | | |
|---|---|---|
| PATENT NO. | : 7,383,875 B2 | Page 1 of 1 |
| APPLICATION NO. | : 10/885683 | |
| DATED | : June 10, 2008 | |
| INVENTOR(S) | : Masanao Yoshimura et al. | |

It is certified that error appears in the above-identified patent and that said Letters Patent is hereby corrected as shown below:

COLUMN 14:

Line 1, "ans said" should read --and said--.

Signed and Sealed this

Tenth Day of February, 2009

JOHN DOLL
*Acting Director of the United States Patent and Trademark Office*